United States Patent [19]
Jacobs et al.

[11] Patent Number: 5,258,482
[45] Date of Patent: * Nov. 2, 1993

[54] POLYISOCYANATES CONTAINING ALLOPHANATE AND ISOCYANURATE GROUPS, A PROCESS FOR THEIR PRODUCTION FROM A MIXTURE OF DIISOCYANATES AND THEIR USE IN TWO-COMPONENT COATING COMPOSITIONS

[75] Inventors: Patricia B. Jacobs, Pittsburgh; Terry A. Potter, Beaver; Richard R. Roesler; Roger W. Rumer, both of Wexford, all of Pa.

[73] Assignee: Miles Inc., Pittsburgh, Pa.

[*] Notice: The portion of the term of this patent subsequent to Jun. 23, 2009 has been disclaimed.

[21] Appl. No.: 897,732

[22] Filed: Jun. 12, 1992

[51] Int. Cl.$^5$ .............................. C08G 18/30
[52] U.S. Cl. .................. 528/49; 252/182.21; 252/182.22; 544/222; 528/73
[58] Field of Search ............ 252/182.21, 182.22; 544/222; 528/73, 49

[56] References Cited

U.S. PATENT DOCUMENTS

| | | | |
|---|---|---|---|
| 3,487,080 | 12/1969 | Matsui et al. | |
| 3,996,223 | 12/1976 | Gupta et al. | |
| 4,324,879 | 4/1982 | Bock et al. | 528/45 |
| 4,412,073 | 10/1983 | Robin | 544/193 |
| 4,582,888 | 4/1986 | Kase et al. | 528/49 |
| 4,604,418 | 8/1986 | Shindo et al. | 524/296 |
| 4,647,623 | 3/1987 | Kase et al. | 525/123 |
| 4,748,242 | 5/1988 | Halpaap et al. | 544/222 |
| 4,789,705 | 12/1988 | Kase et al. | 524/590 |
| 4,801,663 | 1/1989 | Ueyanagi et al. | 525/528 |
| 5,124,427 | 6/1992 | Potter et al. | 528/69 |

*Primary Examiner*—John Kight, III
*Assistant Examiner*—Rachel Johnson
*Attorney, Agent, or Firm*—Joseph C. Gil; Thomas W. Roy

[57] ABSTRACT

The present invention is directed to a polyisocyanate mixture which i) has an NCO content of 10 to 47% by weight, ii) is prepared from a mixture of 1,6-hexamethylene diisocyanate and a cyclic organic diisocyanate having (cyclo)aliphatically-bound isocyanate groups in a molar ratio of 10:90 to 90:10 and iii) contains isocyanurate and allophanate groups in a molar ratio of monoisocyanurates to monoallophanates of 10:1 to 1:5, wherein the allophanate groups are formed from urethane groups which are based on the reaction product of an organic diisocyanate having (cyclo)aliphatically bound isocyanate groups and a monoalcohol containing at least 1 carbon atom and having a molecular weight of up to 2500.

The present invention is also directed to a process for the production of these polyisocyanate mixtures and to their use, optionally in blocked form, as an isocyanate component in two-component coating compositions.

13 Claims, No Drawings

POLYISOCYANATES CONTAINING ALLOPHANATE AND ISOCYANURATE GROUPS, A PROCESS FOR THEIR PRODUCTION FROM A MIXTURE OF DIISOCYANATES AND THEIR USE IN TWO-COMPONENT COATING COMPOSITIONS

BACKGROUND OF THE INVENTION

1. Field of the Invention

The present invention is directed to polyisocyanates which contain allophanate groups and isocyanurate groups and have a low solution viscosity and may be formulated to provide coatings with improved dry times and good environmental etch resistance. The present invention is also directed to a process for the production of these polyisocyanates from a mixture of diisocyanates and to their use in two-component coating compositions.

2. Description of the Prior Art

Polyisocyanates containing isocyanurate groups are known and disclosed in U.S. Pat. Nos. 3,487,080, 3,996,223, 4,324,879 and 4,412,073. While these polyisocyanates possess many outstanding properties, they do require improvement. First, the viscosity of commercially available polyisocyanates containing isocyanurate groups needs to be reduced in order to reduce the amount of solvent which is necessary to obtain a suitable processing viscosity. Presently, there are an increasing number of government regulations which limit the amount of volatile solvents which may be present in coating systems. Therefore, isocyanurate group-containing polyisocyanates may be precluded from certain applications because it is not possible to reduce the viscosity of these polyisocyanates to a suitable processing viscosity without using high amounts of solvent.

Second, coating compositions containing the isocyanurate group-containing polyisocyanates must have fast dry times and result in coatings with good environmental etch resistance in order to withstand the effects of acid rain.

It has been proposed in U.S. Pat. No. 4,801,663 to reduce the viscosity of isocyanurate group-containing polyisocyanates prepared from 1,6-hexamethylene diisocyanate (HDI). By terminating the reaction at a very low degree of trimerization higher contents of the monoisocyanurate of HDI are obtained and the quantity of polyisocyanates containing more than one isocyanurate ring is reduced. Because these latter polyisocyanates have a much higher viscosity than the monoisocyanurate, the resulting polyisocyanates have a reduced viscosity. However, a significant disadvantage of this system is that because the reaction is terminated at a very low degree of trimerization, the overall yield is very low and the amount of HDI which must be separated from the product is substantially increased. In other words the small reduction in viscosity is offset by a significant increase in the production cost of the product. Further, the resulting product does not possess optimum compatibility with highly branched polyester resins.

Accordingly, it is an object of the present invention to provide polyisocyanates which have a reduced solution viscosity and may be formulated to provide coatings with improved dry times and good environmental etch resistance, while possessing the desirable properties of known polyisocyanates containing isocyanurate groups. It is an additional object of the present invention to provide polyisocyanates which may be produced at reasonable production costs and which are obtained in high yields. Surprisingly, these objectives may be achieved in accordance with the present invention as described hereinafter by the incorporation of specific monoalcohols before or during the trimerization of a specific mixture of diisocyanate starting materials in order to produce a polyisocyanate containing isocyanurate and allophanate groups.

U.S. Pat. Nos. 4,582,888, 4,604,418, 4,647,623, 4,789,705 are directed the incorporation of various diols in order to improve the compatibility of the resulting polyisocyanates with certain solvents and co-reactants. While the use of diols may improve the compatibility of the polyisocyanates, the diols do not reduce the viscosity of the polyisocyanurates for a given yield.

Many of these references as well as those previously set forth disclose the use of monoalcohols or glycols as co-catalysts for the trimerization reaction. However, none of these references suggest the incorporation of allophanate groups to reduce the viscosity of polyisocyanates containing isocyanurate groups. Further, these references teach that the use of these cocatalysts should be kept to a minimum since the resulting urethane groups reduce the drying time of coatings prepared from the polyisocyanates. In particular, U.S. Pat. No. 4,582,888 cautions against the use of any amount of monoalcohol which is in excess of that needed to dissolve the catalyst.

Japanese Publication 61-151179 discloses the use of monoalcohols containing 6 to 9 carbon atoms as co-catalysts for trimerization catalysts which do not trimerize HDI in the absence of a co-catalyst.

It has been disclosed in copending applications, U.S. Ser. Nos. 07/644,174 U.S. Pat. No. 5,124,427, 07/733,549 abandoned and 07/733,566 abandoned, to conduct the trimerization of organic diisocyanates in the presence of monoalcohols having molecular weights of up to 2500 to incorporate allophanate groups into the final products and reduce their viscosity. Even though these applications disclose the use of any diisocyanates having (cyclo)aliphatically-bound isocyanate groups as starting materials, they do not recognize the combination of properties which may be obtained by using mixtures of diisocyanates as starting materials as described hereinafter.

SUMMARY OF THE INVENTION

The present invention is directed to a polyisocyanate mixture which
  i) has an NCO content of 10 to 47% by weight,
  ii) is prepared from a mixture of 1,6-hexamethylene diisocyanate and a cyclic organic diisocyanate having (cyclo)aliphatically-bound isocyanate groups in a molar ratio of 10:90 to 90:10 and
  iii) contains isocyanurate and allophanate groups in a molar ratio of monoisocyanurates to monoallophanates of 10:1 to 1:5, wherein the allophanate groups are formed from urethane groups which are based on the reaction product of an organic diisocyanate having (cyclo)aliphatically bound isocyanate groups and a monoalcohol containing at least 1 carbon atom and having a molecular weight of up to 2500.

The present invention is also directed to a process for the production of a polyisocyanate mixture having an NCO content of 10 to 47% by weight and containing isocyanurate and allophanate groups in a molar ratio of monoisocyanurates to monoallophanates of 10:1 to 1:5 by a) catalytically trimerizing a portion of the isocyanate groups of a mixture of 1,6-hexamethylene diisocyanate and a cyclic organic diisocyanate having (cyclo)aliphatically bound isocyanate groups in a molar ratio of 10:90 to 90:10, b) adding 0.001 to 0.5 moles, per mole of organic diisocyanate, of a monoalcohol containing at least one carbon atom and having a molecular weight of up to 2500 to the organic diisocyanate prior to or during the trimerization reaction of step a) and c) terminating the trimerization reaction at the desired degree of trimerization by adding a catalyst poison and/or by thermally deactivating the catalyst.

Finally, the present invention is directed to the use of these polyisocyanate mixtures, optionally in blocked form, as an isocyanate component in two-component coating compositions.

DETAILED DESCRIPTION OF THE INVENTION

In accordance with the present invention the term "monoisocyanurate" means a polyisocyanate containing one isocyanurate group and formed from three diisocyanate molecules, and the term "polyisocyanurate" means a polyisocyanate containing more than one isocyanurate group. The term "monoallophanate" means a polyisocyanate containing one allophanate group and formed from two diisocyanate molecules and 1 monoalcohol molecule, and the term "polyallophanate" means a polyisocyanate containing more than one allophanate group. The term "(cyclo)aliphatically bound isocyanate groups" means aliphatically and/or cycloaliphatically bound isocyanate groups.

In accordance with the present invention a mixture of organic diisocyanates is used as the starting material for the trimerization/allophantization reaction. One of the components is 1,6-hexamethylene diisocyanate. The other component is based on at least one cyclic diisocyanate having (cyclo)aliphatically-bound isocyanate groups. Examples of such cyclic diisocyanates include cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane, 1,3- and 1,4-bis(isocyanatomethyl)-cyclohexane, bis-(4-isocyanato-3-methyl-cyclohexyl)methane, xylylene diisocyanate, $\alpha,\alpha,\alpha',\alpha'$-tetramethyl-1,3- and/or -1,4-xylylene diisocyanate, 1-isocyanato-1-methyl-4(3)-isocyanatomethyl cyclohexane, and 2,4- and/or 2,6-hexahydrotoluylene diisocyanate. Mixtures of cyclic diisocyanates may also be used. Preferred cyclic diisocyanates are isophorone diisocyanate and bis-(4-isocyanatocyclohexyl)-methane.

It is also possible in accordance with the present invention to use blends of the previously mentioned diisocyanates with monoisocyanates or polyisocyanates having 3 or more isocyanate groups, provided that the isocyanate groups are (cyclo)aliphatically bound.

In accordance with the present invention it is preferred to treat the starting diisocyanates by bubbling an inert gas such as nitrogen through the starting diisocyanate in order to reduce the content of carbon dioxide. This process is discussed in German Offenlegungsschrift 3,806,276 (U.S. application Ser. No. 07/311,920), now abandoned.

Trimerization catalysts which are suitable for the process according to the invention include those previously known such as alkali phenolates of the type described in GB-PS 1,391,066 or GB-PS 1,386,399; aziridine derivatives in combination with tertiary amines of the type described in U.S. Pat. No. 3,919,218; quaternary ammonium carboxylates of the type described in U.S. Pat. Nos. 4,454,317 and 4,801,663; quaternary ammonium phenolates with a zwitterionic structure of the type described in U.S. Pat. No. 4,335,219; ammonium phosphonates and phosphates of the type described in U.S. Pat. No. 4,499,253; alkali carboxylates of the type described in DE-OS 3,219,608; basic alkali metal salts complexed with acyclic organic compounds as described in U.S. Pat. No. 4,379,905 such as potassium acetate complexed with a polyethylene glycol which contains an average of 5 to 8 ethylene oxide units; basic alkali metal salts complexed with crown ethers as described in U.S. Pat. No. 4,487,928; aminosilyl group-containing compounds such as aminosilanes, diaminosilanes, silylureas and silazanes as described in U.S. Pat. No. 4,412,073; and mixtures of alkali metal fluorides and quaternary ammonium or phosphonium salts as described in U.S. Ser. No. 07/391,213, now U.S. Pat. No. 4,992,548. The trimerization catalysts should also catalyze the formation of allophanate groups from urethane groups.

Phosphines, such as those described in DE-OS 1,935,763, are not suitable for preparing the products of the present invention. The phosphines, in addition to promoting the trimerization reaction, also promote the dimerization of diisocyanates. Also not suitable are Mannich bases, for example, those based on nonylphenol, formaldehyde and dimethylamine of the type described in U.S. Pat. Nos. 3,996,223 and 4,115,373.

Particularly suitable as catalysts for the process according to the invention are quaternary ammonium hydroxides corresponding to the formula

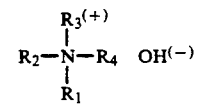

as described in U.S. Pat. No. 4,324,879 and German Offenlegungsschriften 2,806,731 and 2,901,479. Preferred quaternary ammonium hydroxides are those wherein the radicals $R_1$ to $R_4$ represent identical or different alkyl groups having from 1 to 20, preferably from 1 to 4 carbon atoms, which may optionally be substituted by hydroxyl groups. Two of the radicals $R_1$ to $R_4$ may form a heterocyclic ring having from 3 to 5 carbon atoms together with the nitrogen atom and optionally with a further nitrogen or oxygen atom. Also the radicals $R_1$ to $R_3$ in each case may represent ethylene radicals which form a bicyclic triethylene diamine structure together with the quaternary nitrogen atom and a further tertiary nitrogen atom, provided that the radical $R_4$ then represents a hydroxyalkyl group having from 2 to 4 carbon atoms in which the hydroxyl group is preferably arranged in a 2-position to the quaternary nitrogen atom. The hydroxyl-substituted radical or the hydroxyl-substituted radicals may also contain other substituents, particularly $C_1$ to $C_4$-alkoxy substituents.

The production of these quaternary ammonium catalysts takes place in known manner by reacting a tertiary amine with an alkylene oxide in an aqueous-alcoholic medium (c.f. U.S. Pat. No. 3,995,997, col. 2, lines 19–44). Examples of suitable tertiary amines include trimethylamine, tributylamine, 2-dimethylaminoethanol, triethanolamine, dodecyldimethylamine, N,N-dimethylcyclohexylamine, N-methylpyrrolidine, N-methylmorpholine and 1,4-diazabicyclo-[2,2,2]-octane. Examples of suitable alkylene oxides include ethylene oxide, propylene oxide, 1,2-butylene oxide, styrene oxide and methoxy, ethoxy or phenoxy propylene oxide. The most preferred catalysts from this group are N,N,N-trimethyl-N-(2-hydroxyethyl)-ammonium hydroxide and N,N,N-trimethyl-N-(2-hydroxypropyl)ammonium hydroxide. Another most preferred catalyst is N,N,N-trimethyl-N-benzyl-ammonium hydroxide.

The trimerization of the starting diisocyanate mixture may be carried out in the absence or in the presence of solvents which are inert to isocyanate groups. Depending on the area of application of the products according to the invention, low to medium-boiling solvents or high-boiling solvents can be used. Suitable solvents include esters such as ethyl acetate or butyl acetate; ketones such as acetone or butanone; aromatic compounds such as toluene or xylene; halogenated hydrocarbons such as methylene chloride and trichloroethylene; ethers such as diisopropylether; and alkanes such as cyclohexane, petroleum ether or ligroin.

The trimerization catalysts are generally used in quantities of about 0.0005 to 5% by weight, preferably about 0.002 to 2% by weight, based on the diisocyanate used. If, for example, a preferred catalyst such as N,N,N-trimethyl-N-( 2-hydroxypropyl)-ammonium hydroxide is used, then quantities of about 0.0005 to 1% by weight, preferably about 0.001 to 0.02 by weight, based on starting diisocyanate, are generally sufficient. The catalysts may be used in pure form or in solution. The previously named solvents which are inert to isocyanate groups are suitable as solvents, depending on the type of catalysts. Dimethyl formamide or dimethyl sulphoxide may also be used as solvents for the catalysts.

The simultaneous use of co-catalysts is possible in the process according to the invention, but not necessary. All substances from which a polymerizing effect on isocyanates is known are suitable as co-catalysts such as those described in DE-OS 2,806,731. The co-catalysts are optionally used in a lesser amount on a weight basis in relation to the amount of the trimerization catalyst.

In accordance with the present invention urethane groups and subsequently allophanate groups are incorporated into the polyisocyanates by the use of aliphatic, cycloaliphatic, araliphatic or aromatic monoalcohols. The monoalcohols may be linear, branched or cyclic, contain at least one carbon atom and have a molecular weight of up to 2500. The monoalcohols may optionally contain other hetero atoms in the form of, e.g., ether groups. The molar ratio of monoalcohol to diisocyanate is about 0.001 to 0.5, preferably about 0.004 to 0.2. Preferred monoalcohols are hydrocarbon monoalcohols and monoalcohols containing ether groups.

The hydrocarbon monoalcohols preferably contain 1 to 36, more preferably 1 to 20 carbon atoms. Examples of suitable monoalcohols include methanol, ethanol, n-propanol, isopropanol, n-butanol, isobutanol and tert. butanol, n-pentanol, 2-hydroxy pentane, 3-hydroxy pentane, the isomeric methyl butyl alcohols, the isomeric dimethyl propyl alcohols, neopentyl alcohol, n-hexanol, n-heptanol, n-octanol, n-nonanol, 2-ethyl hexanol, trimethyl hexanol, cyclohexanol benzyl alcohol, phenol, the cresols, the xylenols, the trimethylphenols, decanol, dodecanol, tetradecanol, hexadecanol, octadecanol, 2,6,8-trimethylnonanol, 2-t-butyl-cyclohexanol, 4-cyclohexyl-1-butanol, 2,4,6,-trimethyl benzyl alcohol, branched chain primary alcohols and mixtures thereof (which are available from Henkel under to Standamul trademark) and mixtures of linear primary alcohols (which are available from Shell under the Neodol trademark).

Preferred ether-containing monoalcohols include ethoxy methanol, methoxy ethanol, ethoxy ethanol, the isomeric methoxy or ethoxy propanols, the isomeric propoxy methanols and ethanols, the isomeric methoxy butanols, the isomeric butoxy methanols, furfuralcohol and other monoalcohols which have a molecular weight of up to 2500 and are based on ethylene oxide, propylene oxide and/or butylene oxide.

It is also possible in accordance with the present invention to use mixtures of the previously described monoalcohols.

When the polyisocyanates containing isocyanurate groups and allophanate groups accordingly to the invention are prepared from monoalcohols containing ethylene oxide units, the polyisocyanates may be dispersed in water as described in copending application Ser. No. 07/842,866, filed Feb. 27, 1992, now U.S. Pat. No. 5,200,489 the disclosure of which is herein incorporated by reference.

The reaction temperature for isocyanurate and allophanate formation in accordance with the present invention is about 10° to 160° C., preferably about 50° to 150° C. and more preferably about 90° to 120° C.

The process according to the invention may take place either batchwise or continuously, for example, as described below. The starting diisocyanate is introduced with the exclusion of moisture and optionally with an inert gas into a suitable stirred vessel or tube and optionally mixed with a solvent which is inert to isocyanate groups such as toluene, butyl acetate, diisopropylether or cyclohexane. The previously described monoalcohol may be introduced into the reaction vessel in accordance with several embodiments. The monoalcohol may be prereacted with either or both of the components of the starting diisocyanate mixture to form urethane groups prior to introducing the diisocyanates into the reaction vessel; the monoalcohol may be mixed with the diisocyanates and introduced into the reaction vessel; the monoalcohol may be separately added to the reaction vessel either before or after, preferably after, the diisocyanates are added; or the catalyst may be dissolved in the monoalcohol prior to introducing the solution into the reaction vessel.

The polyisocyanates according to the invention may also be prepared by blending polyisocyanates containing isocyanurate groups with monoallophonates.

At a temperature of about 60° C. and in the presence of the required catalyst or catalyst solution the trimerization begins and is indicated by an exothermic reaction. As the reaction temperature increases the conversion rate of urethane groups to allophanate groups increases faster than the formation of isocyanurate groups. Accordingly, at some temperature for a given degree of trimerization, the urethane groups are substantially converted to allophanate groups, while at some lower temperature unreacted urethane groups remain. The progress of the reaction is followed by determining the NCO content by a suitable method such as titration, refractive index or IR analysis. Thus, the reaction may be terminated at the desired degree of trimerization. The termination of the trimerization reaction can take place, for example, at an NCO content of about 15% to 47%, preferably about 20 to 40%.

The termination of the trimerization reaction can take place, for example, by the addition of a catalyst-poison of the type named by way of example in the above-mentioned literature references. For example, when using basic catalysts the reaction is terminated by the addition of a quantity, which is at least equivalent to the catalyst quantity, of an acid chloride such as benzoyl chloride. When using heat-labile catalysts, for example, the previously described quaternary ammonium hydroxides, poisoning of the catalyst by the addition of a catalyst-poison may be dispensed with, since these catalysts decompose in the course of the reaction. When using such catalysts, the catalyst quantity and the reaction temperature are preferably selected such that the catalyst which continuously decomposes is totally decomposed when the desired degree of trimerization is reached. The quantity of catalyst or reaction temperature which is necessary to achieve this decomposition can be determined by a preliminary experiment. It is also possible initially to use a lesser quantity of a heat sensitive catalyst than is necessary to achieve the desired degree of trimerization and to subsequently catalyze the reaction by a further incremental addition of catalyst, whereby the quantity of catalyst added later is calculated such that when the desired degree of trimerization is achieved, the total quantity of catalyst is spent. The use of suspended catalysts is also possible. These catalysts are removed after achieving the desired degree of trimerization by filtering the reaction mixture.

The working-up of the reaction mixture, optionally after previous separation of insoluble catalyst constituents, may take place in various ways depending upon how the reaction was conducted and the area of application for the isocyanates. It is possible to use the polyisocyanates according to the invention which have been produced in solution directly as a lacquer raw material, without a purification stage, if it is not necessary to reduce the free monomer content. Any solvent used during trimerization reaction and any unreacted monomer present in the polyisocyanate product can also be removed by distillation in known manner. The product generally contains a total of less than 2, preferably less than 1% of free (unreacted) monomeric diisocyanates. The products according to the invention generally range from viscous liquids to solids.

The solid products according to the present invention have a lower solution viscosity than similar products which do not contain allophanate groups. In other words the products according to the invention may be dissolved and the viscosity reduced to a suitable processing viscosity using less solvent than is necessary for similar solid products which do not contain allophanate groups.

The products according to the present invention are polyisocyanates containing isocyanurate groups and allophanate groups. The products may also contain residual urethane groups which have not been converted to allophanate groups depending upon the temperature maintained during the reaction and the degree of isocyanate group consumption. The ratio of monoisocyanurate groups to monoallophanate groups present in the polyisocyanates according to the invention is about 10:1 to 1:5, preferably about 5:1 to 1:2.

The products according to the invention are valuable starting materials for the production of polyisocyanate polyaddition products by reaction with compounds containing at least two isocyanate reactive groups. Preferred products are most preferably one or two-component polyurethane coatings.

Preferred reaction partners for the products according to the invention, which may optionally be present in blocked form, are the polyhydroxy polyesters, polyhydroxy polyethers, polyhydroxy polyacrylates and optionally low molecular weight, polyhydric alcohols known from polyurethane coatings technology. Polyamines, particularly in blocked form, for example as polyketimines or oxazolidines are also suitable reaction partners for the products according to the invention. The amounts of the polyisocyanates according to the invention and their reaction partners are selected to provide equivalent ratio of isocyanate groups (whether present in blocked or unblocked form) to isocyanate-reactive groups of about 0.8 to 3, preferably about 0.9 to 1.1.

To accelerate hardening, the coating compositions may contain known polyurethane catalysts, e.g., tertiary amines such as triethylamine, pyridine, methyl pyridine, benzyl dimethylamine, N,N-dimethylamino cyclohexane, N-methylpiperidine, pentamethyl diethylene triamine, 1,4-diazabicyclo[2,2,2]-octane and N,N'-dimethyl piperazine; or metal salts such as iron(III)-chloride, zinc chloride, zinc-2-ethyl caproate, tin(II)-ethyl caproate, dibutyltin(IV)-dilaurate and molybdenum glycolate.

The products according to the invention are also valuable starting materials for two-component polyurethane stoving enamels in which the isocyanate groups are used in a form blocked by known blocking agents. The blocking reaction is carried out in known manner by reacting the isocyanate groups with suitable blocking agents, preferably at an elevated temperature (e.g. about 40° to 160° C.), and optionally in the presence of a suitable catalyst, for example, the previously described tertiary amines or metal salts.

Suitable blocking agents include monophenols such as phenol, the cresols, the trimethylphenols and the tert. butyl phenols; tertiary alcohols such as tert. butanol, tert. amyl alcohol and dimethylphenyl carbinol; compounds which easily form enols such as acetoacetic ester, acetyl acetone and malonic acid derivatives, e.g. malonic acid diethylester; secondary aromatic amines such as N-methyl aniline, the N-methyl toluidine, N-phenyl toluidine and N-phenyl xylidine; imides such as succinimide; lactams such as $\epsilon$-caprolactam and $\delta$-valerolactam; oximes such as butanone oxime and cyclohexanone oxime mercaptans such as methyl mercaptan, ethyl mercaptan, butyl mercaptan, 2-mercaptobenzthiazole, $\alpha$-naphthyl mercaptan and dodecyl mercaptan; and triazoles such as 1H-1,2,4-triazole.

The coating compositions may also contain other additives such as pigments, dyes, fillers, levelling agents and solvents. The coating compositions may be applied to the substrate to be coated in solution or from the melt by conventional methods such as painting, rolling, pouring or spraying.

The coating compositions containing the polyisocyanates according to the invention provide coatings which have improved dry times, adhere surprisingly well to a metallic base, and are particularly light-fast, color-stable in the presence of heat and very resistant to abrasion. Furthermore, they are characterized by high hardness, elasticity, very good resistance to chemicals, high gloss, good weather resistance, good environmental etch resistance and good pigmenting qualities. The polyisocyanates according to the invention also possess good compatibility with highly branched polyester resins.

The invention is further illustrated, but is not intended to be limited by the following examples in which all parts and percentages are by weight unless otherwise specified. The yield was calculated by determining the percentage of unreacted starting diisocyanate in the product prior to distillation.

EXAMPLES

Polyisocyanate 1—According to the Invention

To a 2 liter 3-neck flask equipped with a gas bubbler, mechanical stirrer, thermometer and condenser, were added 126.0 grams of hexamethylene diisocyanate, 982.5 grams of bis-(4-isocyanatocyclohexyl)-methane and 38.6 grams of 1-butanol. Dry nitrogen was bubbled through the stirred reaction mixture while it was heated to 70° C. When a temperature of 70° C. was reached, 6.0 grams of a 5.0% solution of trimethylbenzylammonium hydroxide dissolved in 1-butanol were added to the reaction mixture. An exotherm to 82° C. was observed, and the reaction was cooled to 70° C. After 20 minutes an NCO content of 24.7% was attained, and the reaction was stopped by the addition of 6.0 grams of a 25% solution of di-(2-ethylhexyl)-phosphate in hexamethylene diisocyanate. The excess monomer was removed by thin film evaporation to provide a pale yellow product that was solid at 25° C., contained 38% HDI and 61% bis-(4-isocyanatocyclohexyl)-methane, and had an NCO content of 13.5% and a free monomer content of 0% HDI and 7.0% bis-(4-isocyanatocyclohexyl)-methane. The yield was 42%.

Polyisocyanate 2—According to the Invention

To a 5 liter 3-neck flask equipped with a gas bubbler, mechanical stirrer, thermometer and condenser, were added 1050 grams of hexamethylene diisocyanate, 2081.3 grams of isophorone diisocyanate and 107 grams of 1-butanol. Dry nitrogen was bubbled through the stirred reaction mixture while it was heated to 70° C. When a temperature of 70° C. was reached, 20.0 grams of a 10% solution of trimethylbenzylammonium hydroxide dissolved in 1-butanol were added to the reaction mixture. An exotherm to 86° C. was observed, and the reaction was cooled to 70° C. After 20 minutes an NCO content of 26.8% was attained, and the reaction was stopped by the addition of 15.5 grams of a 25% solution of di-(2-ethylhexyl)-phosphate in hexamethylene diisocyanate. The excess monomer was removed by thin film evaporation to provide a pale yellow, clear solid having the properties set forth in the Table. The excess monomer was removed by thin film evaporation to provide a pale yellow product that was solid at 25° C., contained 49.6% HDI and 50.4% IPDI, and had an NCO content of 16.2% and a free monomer content of 0.04% HDI and 0.57% IPDI. The yield was 57%.

Polyisocyanate 3—Comparison

To a 500 ml 3-neck flask equipped with a gas bubbler, mechanical stirrer, thermometer and condenser, were added 300 grams of hexamethylene diisocyanate and 6.6 grams of 1-butanol. The stirred mixture was heated for 1 hour at 60° C. while dry nitrogen was bubbled through the reaction mixture. The temperature of the reaction mixture was then raised to 90° C. To the reaction mixture at 90° C. was added 0.38 parts of a 4.4% solution of trimethylbenzylammonium hydroxide dissolved in 1-butanol. When the reaction mixture reached an NCO content of 37.5%, the reaction was stopped by adding 0.332 of a 10% solution of di-(2-ethylhexyl)-phosphate in hexamethylene diisocyanate. The excess monomer was removed by thin film evaporation to provide an almost colorless clear liquid having a viscosity of 890 mPa.s (25° C.), an NCO content of 20.8% and a free monomer (HDI) content of 0.4%. The yield was 39%.

Polyisocyanate 4—Comparison

To a 2 liter 3-neck flask equipped with a gas bubbler, mechanical stirrer, thermometer and condenser, were added 415 grams of hexamethylene diisocyanate and 740 grams of isophorone diisocyanate. The isocyanate mixture was degassed at reduced pressure for 1 hour. The vacuum was released and dry nitrogen was bubbled through the stirred reaction mixture for two hours. Nitrogen bubbling was continued as the reaction mixture was heated to 70° C. To the reaction mixture at 70° C. were added 17.7 grams of a 10% solution of N,N,N-trimethyl-N-(2-hydroxypropyl)-ammonium hydroxide dissolved in 2-ethyl-1,3-hexanediol. The reaction exothermed to 80° C. and was maintained between 80° C. and 85° C. for the duration of the reaction. When the reaction mixture reached an NCO content of 28.7%, the reaction was stopped by the addition of 16.9 grams of a 25% solution of di-(2-ethylhexyl)-phosphate in hexamethylene diisocyanate. The excess monomer was removed by thin film evaporation to provide an almost colorless product that was solid at 25° C., contained 48.3% HDI and 51.7% IDPI, and had an NCO content of 17.2% and a free monomer content of 0.1% HDI and 0.2% IPDI. The yield was 50%.

Polyisocyanate 5—Comparison

An isocyanurate group-containing polyisocyanate prepared by trimerizing a portion of the isocyanate groups of 1,6-hexamethylene diisocyanate and having an isocyanate content of 21.6% by weight, a content of monomeric diisocyanate of <0.2%, a viscosity at 20° C. of 3000 mPa.s.

Polyisocyanate 6—Comparison

A blend, wherein the percentages are based on solids, of 52.6% of Polyisocyanate 5 and 47.4% of an isocyanurate group-containing polyisocyanate present as a 70% solution in a 1:1 blend of propylene glycol monomethyl ether acetate and xylene and prepared by trimerizing a portion of the isocyanate groups of isophorone diisocyanate, wherein the solution has an isocyanate content of 11.7% by weight, a content of monomeric diisocyanate of <0.5%, a viscosity at 20° C. of 1300 to 2700 mPa.s.

Preparation of Coating Compositions

Polyisocyanates 1-6 were adjusted to a solids content of 65% by the addition of 1:1:1 mixture of propylene glycol monomethyl ether acetate/xylene/butyl acetate. To demonstrate the improved dry times which may be obtained from the polyisocyanates according to the present invention, coatings were prepared from Polyisocyanates 1-6 and the isocyanate-reactive component from a commercial automotive refinish system, Centari white topcoat (available from DuPont). The isocyanate-reactive component, which is identified as DuPont Acrylic Enamel 817A White, is based on a blend of alkyd and acrylic resins. To prepare the coating compositions 1.3 parts of Polyisocyanates 1-6 were used in place of 1.0 part of DuPont Hardener 793S.

The coating compositions contained 117 grams of 817A, 15.5 grams of the polyisocyanate and 44 grams of DuPont 8022S solvent package, a proprietary blend of solvents. The coating compositions were applied to glass in wet film thicknesses of 3 mils to determine the Gardner dry time, 5 mils to determine Tack Free Time according to ASTM D-1640 and 6 mils to determine the Pendulum Hardness. The results of these tests are set forth in the following Table.

TABLE I

| Polyisocyanate | Gardner Dry Time | | | Tack Free Time | Pendulum Hardness | | |
|---|---|---|---|---|---|---|---|
| | SD (hr) | HD (hr) | MF (hr) | (min) | 24 hrs | 48 hrs | 1 wk |
| 1 | ¼ | ¾ | >5 | 60 | 132.2 | 155.4 | 163.8 |
| 2 | ¼ | ¾ | 2¼ | 75 | 135.8 | 158.2 | 166.6 |
| 3 (Comp) | 1 | 1½ | 2¼ | 150 | 89.6 | 119 | 142.8 |
| 4 (Comp) | 1 | 3½ | >6 | 80 | 141.4 | 161 | 166.6 |
| 5 (Comp) | ¾ | 1½ | 2¼ | 130 | 78.4 | 102.2 | 144.2 |
| 6 (Comp) | ¾ | 1 | 4 | 95 | 112 | 134.4 | 161.0 |

The Gardner dry time was determined using a Gardner Circular Drying Time Recorder.

SD (Set-to-touch)—During the first stage of drying the film is mobile and partially flows back into the scribed channel. The film may be considered "set-to-touch" when it no longer flows back and the stylus begins to leave a clear channel.

HD (Hard-dry)—when the stylus no longer ruptures the film, but moves freely upon the surface, the cross-section of the film may be considered to have reached the "hard-dry" condition.

MF (Mar-free)—When the stylus no longer mars the surface of the film at all the film may be considered to be "mar-free."

The Tack Free Time is determined using the Mechanical Method (Tack Tester) in accordance with ASTM D-1640.

The Pendulum Hardness was determined by evaluating coated panels on a Pendulum Hardness Tester. The tester was levelled, and at the desired interval of measurement the metal plate was placed on the sample stage of the tester. The fulcrum points of the pendulum were lowered onto the curing film, the pendulum was deflected 6° and released. The time for the pendulum to damp to a 3° deflection was recorded.

The examples of the subject application demonstrate the improved dry times which may be obtained in accordance with the present invention, especially when the values for the Tack Free Time are compared. The primary difference between the Polyisocyanates 3 and 5 is that Polyisocyanate 3 contains allophanate groups and Polyisocyanate 5 does not. Because the tack free time for the coating prepared from Polyisocyanate 3 was 150 minutes vs. 130 minutes for the coating prepared from Polyisocyanate 5, it is apparent that the presence of allophanate groups results in a slight increase in the drying time. However, this same trend is not present when the Polyisocyanates 1 and 2, according to the invention, are compared to Polyisocyanate 4. Even though Polyisocyanates 1 and 2 contain allophanate groups, coatings prepared from these polyisocyanate have a tack free time which is less than that for the coating prepared from Polyisocyanate 4.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyisocyanate mixture having an NCO content of 10 to 47% by weight and containing isocyanurate and allophanate groups in a molar ratio of monoisocyanurates to monoallophanates of 10:1 to 1:5 which comprises
   a) catalytically trimerizing a portion of the isocyanate groups of a mixture of 1,6-hexamethylene diisocyanate and a cyclic organic diisocyanate having (cyclo)aliphatically bound isocyanate groups in a molar ratio of 10:90 to 90:10,
   b) adding 0.001 to 0.5 moles, per mole of said organic diisocyanate, of a monoalcohol containing at least 1 carbon atom and having a molecular weight of up to 2500 to said organic diisocyanate prior to or during the trimerization reaction of step a) and
   c) terminating the trimerization reaction at the desired degree of trimerization by adding a catalyst poison and/or by thermally deactivating the catalyst.

2. The process of claim 1 wherein said cyclic organic diisocyanate comprises bis-(4-isocyanatocyclohexyl)-methane.

3. The process of claim 1 wherein said monoalcohol comprises a hydrocarbon monoalcohol containing 1 to 20 carbon atoms.

4. The process of claim 2 wherein said monoalcohol comprises a hydrocarbon monoalcohol containing 1 to 20 carbon atoms.

5. The process of claim 1 wherein said monoalcohol comprises 1-butanol.

6. The process of claim 2 wherein said monoalcohol comprises 1-butanol.

7. A polyisocyanate mixture which
   i) has an NCO content of 10 to 47% by weight,
   ii) is prepared from a mixture comprising 1,6-hexamethylene diisocyanate and a cyclic organic diisocyanate having (cyclo)aliphatically-bound isocyanate groups in a molar ratio of 10:90 to 90:10 and
   iii) contains isocyanurate and allophanate groups in a molar ratio of monoisocyanurates to monoallophanates of 10:1 to 1:5, wherein the allophanate groups are formed from urethane groups which are based on the reaction product of an organic diisocyanate having (cyclo)aliphatically bound isocyanate groups and a monoalcohol containing at least one carbon atom and having a molecular weight of up to 2500.

8. The polyisocyanate mixture of claim 7 wherein said cyclic organic diisocyanate comprises bis-(4-isocyanato cyclohexyl)-methane.

9. The polyisocyanate mixture of claim 7 wherein said monoalcohol comprises a hydrocarbon monoalcohol containing 1 to 20 carbon atoms.

10. The polyisocyanate mixture of claim 8 wherein said monoalcohol comprises a hydrocarbon monoalcohol containing 1 to 20 carbon atoms.

11. The polyisocyanate mixture of claim 7 wherein said monoalcohol comprises 1-butanol.

12. The polyisocyanate mixture of claim 8 wherein said monoalcohol comprises 1-butanol.

13. A two-component coating composition comprising the polyisocyanate of claim 7 and a compound containing isocyanate-reactive groups.

* * * * *